United States Patent [19]
Woodworth et al.

[11] 3,920,199
[45] Nov. 18, 1975

[54] RATE-GYRO STABILIZED PLATFORM

[75] Inventors: William H. Woodworth, China Lake; Marc L. Moulton, Ridgecrest, both of Calif.

[73] Assignee: The United States of America as represented by the Secretary of the Navy, Washington, D.C.

[22] Filed: May 3, 1974

[21] Appl. No.: 466,564

[52] U.S. Cl. .................... 244/3.2; 244/3.14
[51] Int. Cl.$^2$ ........................... F42B 15/02
[58] Field of Search ............... 244/3.1, 3.14, 3.2

[56] References Cited
UNITED STATES PATENTS

| | | | |
|---|---|---|---|
| 2,959,375 | 11/1960 | Dunnegan, Jr. | 244/3.14 |
| 3,293,360 | 12/1966 | Smith | 244/3.14 X |
| 3,337,161 | 8/1967 | Halton | 244/3.14 |
| 3,415,465 | 12/1968 | Bedford | 244/3.14 |
| 3,474,968 | 10/1969 | Donaldson | 244/3.1 |

*Primary Examiner*—Verlin R. Pendegrass
*Attorney, Agent, or Firm*—R. S. Sciascia; Roy Miller; Robert W. Adams

[57] ABSTRACT

An electronic guidance system compensation network of a rate gyro stabilized platform wherein missile stability is improved by compensating for the gimbal's bearing, or coulomb, friction.

4 Claims, 1 Drawing Figure

RATE-GYRO STABILIZED PLATFORM

BACKGROUND OF THE INVENTION

In guidance systems for, such as, controlling the flight of a missile, the platform on which the sensor or detector in the form, for example, of a vidicon is mounted must be fully stabilized if the object or target of interest is to be accurately tracked. The platform is routinely mounted on gimbals which are controlled by torquers in response to tracking signals generated in the gimbals' associated electronics. Gyros are often used as stabilizing devices.

A rate-gyro measures the angular rate of change, or velocity, rather then the position or acceleration, and if included in a Type II servo system the velocity and position errors with the tracker unit are always zero. By its nature, though, an acceleration error may result if the object tracked is continuously changing its velocity. The output of the rate-gyro is definitive of the spatial angular rate of the object or target. Previously, guidance signals derived from rate-gyro stabilized platforms have resulted in unstable missile performance. That is, electrical transient signals inherently present in the system have made the utilization of such systems impractical in applications requiring precise and accurate tracking. The transients cause overshoot or oscillation of the missile and often result in loss of target lock-on, and uncontrolled flight.

As a result, previously, systems employing rate-gyros were impractical for many applications due to their failure to carry out their designed purpose, i.e., that of providing signals for stabilizing or controlling the course of the missile or other vehicles.

BRIEF DESCRIPTION OF THE DRAWINGS

The FIGURE is a schematic diagram of the preferred embodiment of the present invention showing electrical circuitry that may be employed.

DESCRIPTION OF THE PREFERRED EMBODIMENT

Figure 1:
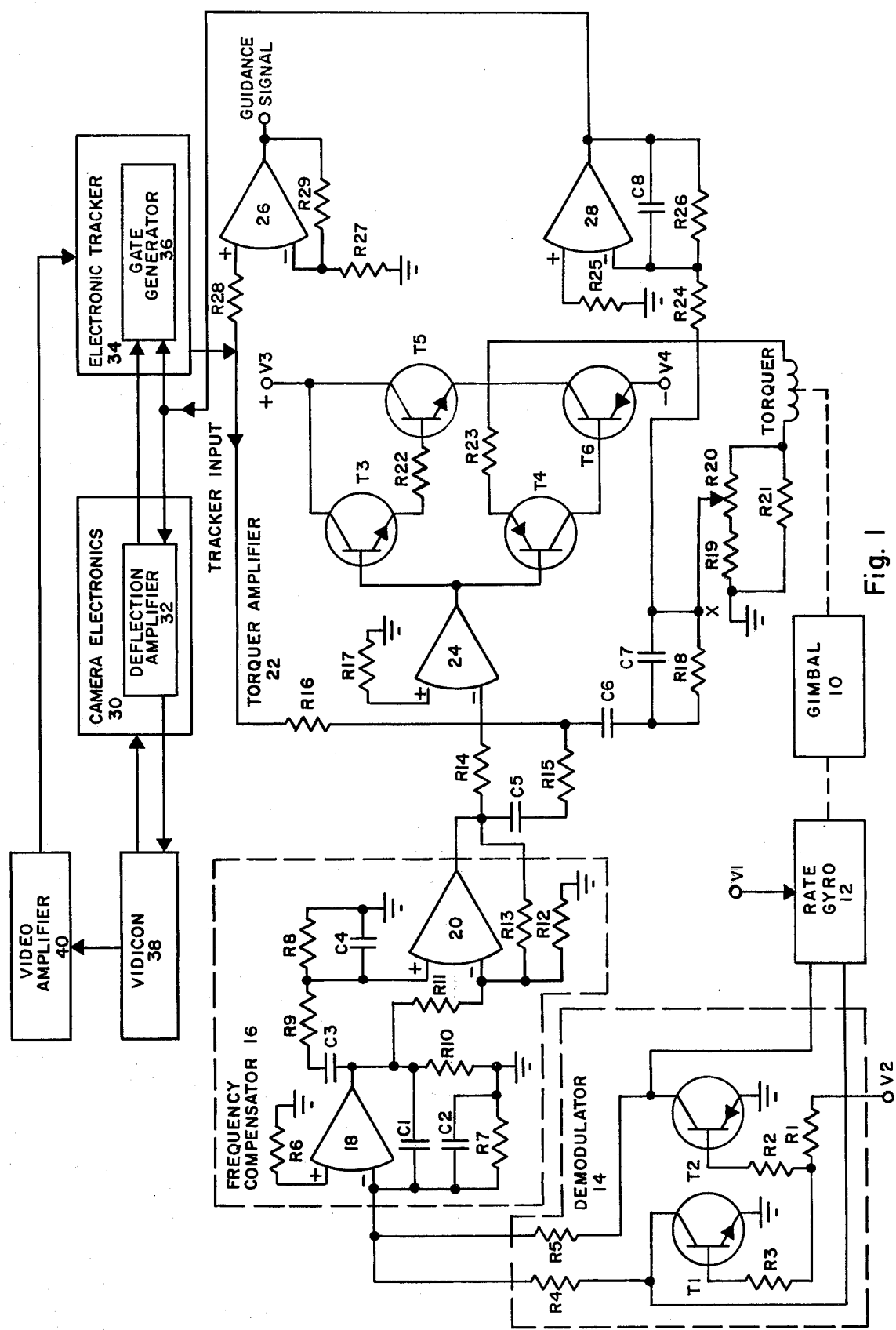

An embodiment showing the technique of the present invention is shown in the drawing. The circuit shown is offered only as an example of the manner of implementing the present invention. Shown are gimbal 10 mechanically connected to the torquer, and rate-gyro 12 connected to the gimbal. Also shown are demodulator 14 connected to the output of rate-gyro 12 for demodulating the gyro output; frequency compensator 16 connected to demodulator 14 to maintain or increase the low and high frequency gains as one means of improving stability; torquer amplifier 22 coupled to compensator 16 to provide a controlled output to the torquer; a guidance signal compensation network comprising integrating amplifier 28; camera electronics 30 and deflection amplifier 32; electronic tracker 34 and gate generator 36 for achieving improved guidance signal characteristics; guidance amplifier 26 coupled to electronic tracker 34 to provide the output guidance signal; and vidicon 38 and video amplifier 40 connected to the camera electronics 30 and electronic tracker 34 to complete the operable system.

Gimbal 10 is a device for mounting the platform on the missile body wherein the platform is permitted to be driven freely in any direction by the torquer so that its spatial position will be unaltered when the missile is tipped or turned. Rate-gyro 12 is sensitive to the angular velocity, or rate of change of the position of gimbal 10, and provides an electrical output having zero velocity and position errors with the tracker of the missile. That is, the output of rate gyro 12 is the spatial angular rate of the platform, or gimbal.

The rate-gyro feedback loop shown in the drawing, including gimbal 10, rate-gyro 12, demodulator 14, frequency compensator 16, torquer amplifier 22 and the torquer, provides spatial stabilization of the gimbals when they are uncaged. Since the rate-gyro platform has no angular momentum stabilization, it is more susceptible to perturbing torques from the bearings, the flex leads across the gimbals, and platform unbalance.

Because the effect of these perturbations is reduced as the gain is increased, maintaining high gain in the loop is important. Analysis of the loop indicates that as the moment of inertia of the gimbals is increased the gain may be increased proportionally. Therefore, the moment of inertia is kept as high as practical in a preferred system.

To counter the effect of the lead torques, an integrator is included in frequency compensator 16 to keep the low frequency gain high. As a result, the transfer function must be modified to $(\tau s + 1)/s$ to maintain loop stability. The gain may be further increased by the use of additional higher frequency compensation, if desired. Also, if the requirements for stability are examined, they show that as the natural frequency of the rate-gyros is increased the loop gain may also be increased. The frequency compensator shown is offered as an example of one approach that may be utilized. It should be noted that other frequency compensation circuitry and techniques may be employed if it is desired to achieve the high gain that has been found to be advantageous.

The frequency compensation technique employed in the example shown in the FIGURE is composed primarily of three sections. The first section consists of a pair of complex zeros and a pair of complex poles, such as, $$\frac{(41 \times 10^{-6}S^2 + 8 \cdot 2 \times 10^{-3}s + 1)}{(10 \times 10^{-6}S^2 + 2 \times 10^{-3}s + 1)} .$$

The complex zeros are chosen to cancel the complex poles of the rate-gyro and, therefore, have a natural frequency equal to the natural frequency of the gyros used. The damping factor for the complex zeros is chosen to optimize the compensation for the temperature range over which the platform must remain stable. The complex poles generated then replace those of the rate-gyro but at a higher frequency, allowing an increase in loop gain. The overall effect is that of using gyros with a higher natural frequency. Theoretically this form of compensation could be extended considerably. The second section of the frequency compensation technique consist of a lead-lag network, such as, $$\frac{(6.2 \times 10^{-3}s + 1)}{(3.1 \times 10^{-3}s + 1)} ,$$

the inclusion of which allows a further increase in gain. The third section is the addition of an active integrator $(1/s)$ to the loop to further reduce the effects of lead torques, bearing friction, and residual gimbal unbalance. This integration must be modified by a zero (such as $0.085\ s + 1$) with a time constant enough larger than the other time constants in the loop to prevent this part of the compensation from interacting appreciably with the higher frequency terms. The remaining poles in the system shown are primarily for filtering the 840 Hz gyro ripple, and are placed as high as possible because they cause some reduction in the allowable loop gain. For the configuration shown in the FIGURE, external signals may be summed with the rate-gyro output in the torquer amplifier, such as at the point labeled tracker input to provide commanded motion of the platform at a rate proportional to the command voltage.

Guidance signals for controlling the flight of a missile are routinely derived from the guidance section. Often, either the rate-gyro output or the electronic tracker output may be used. But, both of these outputs include the effect of the gimbal response to the various inherent gimbal frictions, such as coulomb friction of the bearings. If the platform were moved with the gimbals initially at rest, or if the direction of motion were reversed, the gimbals effectively lock until sufficient torque is built up in the torquers to overcome the static friction. The elctronic tracker and the rate-gyros respond to these conditions with outputs proportional to the amount of friction, but of opposite polarity to their response to a commanded motion. Therefore, if either of these signals were used directly for missile control, the guidance loop would receive positive feedback until the gimbal friction is overcome. As a result, the flight would be unstable.

A primary novelty of the present invention is a technique to derive a guidance signal that is compensated to cancel the above-described response to gimbal friction. The technique corrects the guidance signal by removing the requirement of tracker response to the gimbal friction, which is accomplished by deriving a signal that may be coupled to the vidicon deflection circuits in the camera to shift the raster on the vidicon in missiles employing a vidicon sensor. Although the approach may be utilized on any vidicon, it is particularly adaptable to a system using a magnetically deflected vidicon. The technique is employed in the example shown in the FIGURE by the addition of the integrator comprising operational amplifier 28 that is coupled to the output of torquer amplifier 22 at point X. The integrator's output is coupled to the existing deflection amplifiers 32 of camera electronics 30, and gate generator 36 of electronic tracker 34. If the integrator has an output only of locked gimbal conditions, it can then counter the scene shift caused by the gimbal friction and, thereby, eliminate this input to the tracker. The tracker output can then be used directly for weapon guidance. An additional advantage is that the performance of the tracker is improved when compared with previous compensation techniques, or no compensation at all, since the tracker is no longer required to respond to the effects of the gimbal friction.

The technique is more easily understood by separately considering the circuits response to the two possible conditions, e.g., the first being before friction is overcome (gimbals locked), and the second being after friction is overcome (gimbals completely free). With the gimbals locked, the sum of the tracker and gyro outputs would not be zero but, for the compensation technique employed. The only input to the torquer amplifier with the gimbals locked will then be that of rate-gyro 12 ($K_4 s\theta$). The response of torquer amplifier 22 is esstentially $K_5(\tau s + 1)/s$ so that its output at point X will be $K_4 K_5 \theta(\tau_1 s + 1)$. This signal is than frequency compensated by a pole $K_6/(\tau_1 s + 1)$, resulting in a correction signal ($K_4 K_5 K_6 \tau$) for shifting the raster. If $K_7$ is the response of the deflection circuit in degrees per volt to the correction signal, the correct gain will result if $K_4 K_5 K_6 K_7 = 1$.

With the gimbals free, no torque is required to maintain gimbal motion. Therefore, the output of electronic tracker 34 and the output of rate-gyro 12 will sum in torquer amplifier 22 with equal and opposite currents, the ratio of these two signals being consequently defined by the ratio of the two respective summing resistors, R14 and R16. These two signals are then summed in operational amplifier 24 with the resultant output being zero.

In many guidance systems, the video gate position on the raster is DC referenced to the deflection ramps generated by the deflection amplifiers. Consequently any DC shift in these ramps produces a corresponding shift in the gate position with respect to the raster center. The correction signal from operational amplifier 28 is, therefore, also fed to the gate positioning circuitry of the electronic tracker (gate generator 36) to cancel this effect. This is accomplished by summing the correction signal with the deflection ramp in an existing operational amplifier in the tracker having response $K_8$ and $-K_9$, respectively, to the two signals, and a voltage gain of $K_{10}$ in the deflection amplifier. Circuit operation is then correct if $K_8 = K_9 K_{10}$.

The television camera and guidance system of the example shown may be of any classical design. Or, the television camera employed may be of the design disclosed in U.S. patent application Ser. No. 238,710 entitled Television Camera by William H. Woodworth. The subject matter of U.S. Pat. No. 3,764,923 entitled "Automatic Pulse Level Control" by William H. Woodworth et al., and U.S. Pat. No. 3,775,558 entitled "Digital Phase Discriminators in Video Gate Generators" by Marc L. Moulton may be employed as components in an operable system with the present invention. The circuitry of the FIGURE has been found to be operable with the following components:

| SYMBOL | COMPONENT | TYPE OR VALUE |
| --- | --- | --- |
| R1 | Resistor | 6.8K |
| R2 | " | 1.2K |
| R3 | " | 1.2K |
| R4 | " | 11K |
| R5 | " | 11K |
| R6 | " | 5.1K |
| R7 | " | 51K |
| R8 | " | 3.14K |
| R9 | " | 130K |
| R10 | " | 51K |
| R11 | " | 82K |
| R12 | " | 3.4K |
| R13 | " | 82K |
| R14 | " | 33K |
| R15 | " | 8.2K |
| R16 | " | 68K |
| R17 | " | 33K |
| R18 | " | 4.7K |
| R19 | " | 91Ω |
| R20 | " | 500Ω |
| R21 | " | 1Ω |
| R22 | " | 68Ω |
| R23 | " | 68Ω |
| R24 | " | 2.4K |
| R25 | " | 2K |
| R26 | " | 24K |
| R27 | " | 8.2K |
| R28 | " | 6.2K |
| R29 | " | 20K |
| C1 | Capacitor | 0.0075μfd |
| C2 | " | 0.025μfd |
| C3 | " | 0.1μfd |
| C4 | " | 1.0μfd |
| C5 | " | 0.15μfd |

-continued

| SYMBOL | COMPONENT | TYPE OR VALUE |
|---|---|---|
| C6 | " | 18µfd |
| C7 | " | 0.22µfd |
| C8 | " | 3.5µfd |
| $V_1$ | Voltage Supply | 28V, 420Hz |
| $V_2$ | " | 28V, 420Hz |
| $V_3$ | " | +28v, 420Hz |
| $V_4$ | " | −28V, 420Hz |
| T1 | Transistor | 2N2102 |
| T2 | " | 2N4036 |
| T3 | " | 2N2102 |
| T4 | " | 2N4036 |
| T5 | " | 2N5192 |
| T6 | " | 2N5192 |
| 18 | Operational amplifier | µA741 |
| 20 | " | µA741 |
| 24 | " | µA741 |
| 26 | " | µA741 |
| 28 | " | µA741 |

Transfer Function of Gimbal 10 = $\frac{1}{S^2 J}$, where $J = 0.005$ slug-ft²

Transfer Function of Rate Gyro 12 = $\frac{S}{S^2/\omega_n + 2\zeta s/\omega_n + 1}$ An advantage of the present invention employing the above-described compensation technique is that the platform motion caused by the gimbal bearings or other resistance to movement is countered, permitting rategyro servo systems to be effective in stabilizing missile, or other vehicle platforms.

What is claimed is:

1. In a rate-gyro controlled platform of a missile guidance system, a platform stabilizing network, comprising:

an electronically driven, gimbal mounted, rate-gyro stabilized platform on a supporting structure wherein the rate-gyro is electronically processed to provide an electrical output deviant from a value indicative of the spatial angular rate of change of the platform by a value indicative of the coulomb friction inherent in the gimbal bearings;

circuit means coupled to said output for providing an electrical signal definitive of said value indicative of the coulomb friction, which signal can be used to compensate for said deviation.

2. The apparatus of claim 1 wherein said platform is driven by at least one torquer controlled by a combination of said processed output and an externally generated signal, and said circuit means includes an integrator coupled to said combination to provide an output for said compensation.

3. The apparatus of claim 2 further including a vidicon and video amplifier for sensing and amplifying the electronic image of an object of interest; electronics associated with said vidicon for controlling the trace of said vidicon, including a deflection amplifier; and, an electronic tracker including a gate generator for tracking said object by maintaining said image within the gate generated by said gate generator; wherein the output of said integrator is coupled to said deflection amplifier and gate generator to compensate for said deviation.

4. The apparatus of claim 3 wherein a demodulator is coupled to the output of said rate-gyro, a frequency compensator is coupled to said demodulator, and a torquer amplifier including said torquer is coupled to said frequency compensator, for processing the output of said rate-gyro, wherein said tracker provides an output coupled to said torquer amplifier for combining with the output of said frequency compensator for controlling said torquer.

* * * * *